US008948024B2

(12) United States Patent
Eggerl et al.

(10) Patent No.: US 8,948,024 B2
(45) Date of Patent: Feb. 3, 2015

(54) NETWORK SIMULATION RACK AND SYSTEM

(75) Inventors: Edward M. Eggerl, Catonsville, MD (US); Gary C. Trotter, Columbia, MD (US); David L. Tingley, New Windsor, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 802 days.

(21) Appl. No.: 12/847,430

(22) Filed: Jul. 30, 2010

(65) Prior Publication Data

US 2012/0027021 A1 Feb. 2, 2012

(51) Int. Cl.
*H04L 12/26* (2006.01)
*H04L 12/773* (2013.01)
*H04L 12/939* (2013.01)

(52) U.S. Cl.
CPC .............. *H04L 45/60* (2013.01); *H04L 49/555* (2013.01); *H04L 43/00* (2013.01); *H04L 12/2697* (2013.01); *H04L 43/50* (2013.01)
USPC ............................ 370/250; 370/386; 709/250

(58) Field of Classification Search
None
See application file for complete search history.

(56) References Cited

U.S. PATENT DOCUMENTS

| 2004/0228278 | A1* | 11/2004 | Bruckman et al. | 370/231 |
|---|---|---|---|---|
| 2004/0240440 | A1* | 12/2004 | Wild et al. | 370/389 |
| 2006/0067223 | A1* | 3/2006 | Nomura et al. | 370/232 |
| 2007/0025261 | A1* | 2/2007 | Ginsberg et al. | 370/250 |
| 2007/0053360 | A1* | 3/2007 | Hino et al. | 370/392 |
| 2007/0058541 | A1* | 3/2007 | Pike et al. | 370/230 |
| 2007/0146997 | A1* | 6/2007 | Foster, Sr. | 361/700 |
| 2010/0306408 | A1* | 12/2010 | Greenberg et al. | 709/238 |

\* cited by examiner

*Primary Examiner* — Khoa Huynh

(57) ABSTRACT

Various exemplary illustrations are provided of systems and methods for simulating a communication network. An exemplary system may include a communication router rack in communication with an external network. The rack may include a structure supporting a plurality of network router cards, each including a plurality of communication ports configured to allow selective communication between communication devices connected to the router cards and the external network. The router rack may further include a switching circuit enclosed by the rack structure that is in physical communication with the plurality of network router cards. The switching circuit may be configured to determine a unique network identifier for each of the plurality of network router cards to the external network. The rack may further include an external communication port configured to be selectively connected to the external network to allow communication between the plurality of network router cards and the external network.

25 Claims, 6 Drawing Sheets

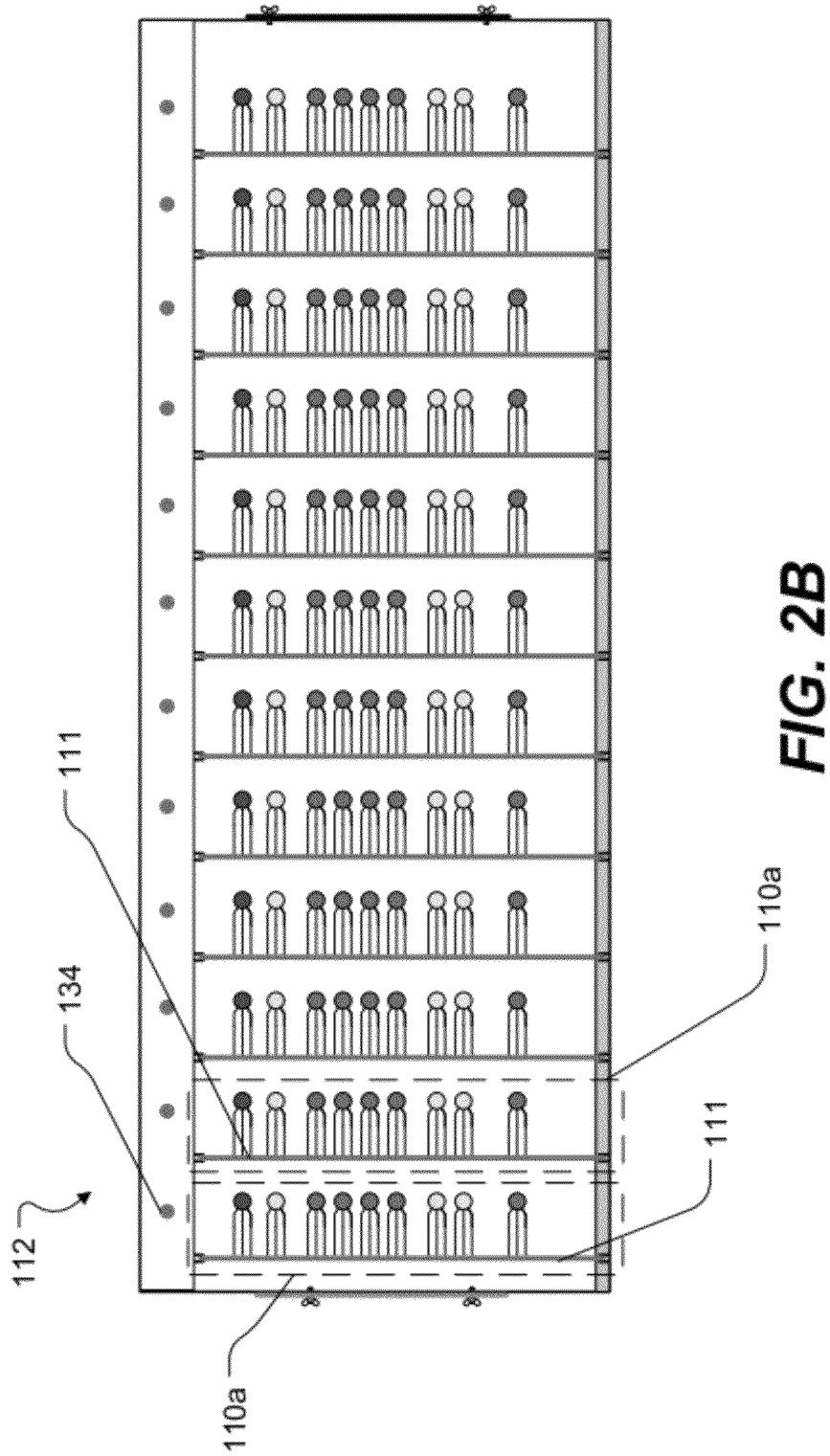

NETWORK SIMULATION RACK AND SYSTEM

BACKGROUND

Routers generally provide an interface to a communication network for a plurality of devices at a given location, e.g., a home or office. For example, routers may generally route and forward data such as by way of packets to an external communication network. Routers often provide for the direct connection of on the order four or five devices by way of ports for those situations where concentrators are not necessary or to permit the addition of concentrators that permit additional wired connections into a network before being transmitted to and from one of the ports of the router. Often routers are designed with enclosures with an emphasis on aesthetics or appearance, and generally without regard to minimizing overall size of the assembled router. Fully assembled routers are therefore typically several times larger in width, height, and depth than the essential components used to perform the functions of the router, e.g., routing and addressing data to and from devices connected to the router.

By contrast, telecommunication service providers wishing to test communication networks typically use a large number of devices in order to simulate larger components of the networks, e.g., branches of networks including network terminals, the use of concentrators and the like. Thus, it may be necessary for the service provide to use a large number of routers in testing environments or laboratories in order to provide an adequate number of connections for the many devices and to represent the end points of networks where end user equipment resides that are connected to the rest of the network by way of the local router. This necessarily results in a large footprint for the test setup.

Accordingly, there is a need for a more space-efficient manner to simulate networks or network branches where a relatively large numbers of devices, including routers, are involved.

BRIEF DESCRIPTION OF THE DRAWINGS

FIG. 2B is a front view of another exemplary rack structure for a plurality of router cards;

DETAILED DESCRIPTION

Various exemplary illustrations are provided of a communication network simulation system. An exemplary system may include a test communication network configured to transmit data to a plurality of communication devices. The system may further include a communication router rack in communication with the network. The router rack may include a rack structure supporting a plurality of network router cards. In some examples the router cards are printed circuit boards (PCBs), thereby providing the router functionality with a minimal footprint that is generally defined by the size of the PCB itself. Each of the router cards may include a plurality of communication ports configured to allow selective communication between communication devices connected to the router cards and the test communication network. The router rack may further include a switching circuit in communication with the plurality of network router cards that is configured to determine a unique network identifier for each of the plurality of network router cards. The switching circuit may be enclosed within the rack structure. As described further below, the switching circuit may be in physical communication with the router cards. The rack may further include an external communication port associated with the rack structure that is configured to be selectively connected to the test communication network to allow communication between the plurality of network router cards and the test communication network.

An exemplary method may include receiving a plurality of router cards in a rack structure, each of the network router cards including a plurality of communication ports that are configured to allow selective communication between a communication device and an external network. The method may further include providing a single external communication port configured to be selectively connected to the external network to allow communication between the plurality of network router cards and the external network, and establishing a unique network identifier for each of the plurality of network router cards on the network. The unique network identifier may be established with a switching circuit in physical communication with the plurality of router cards.

Figure 1:
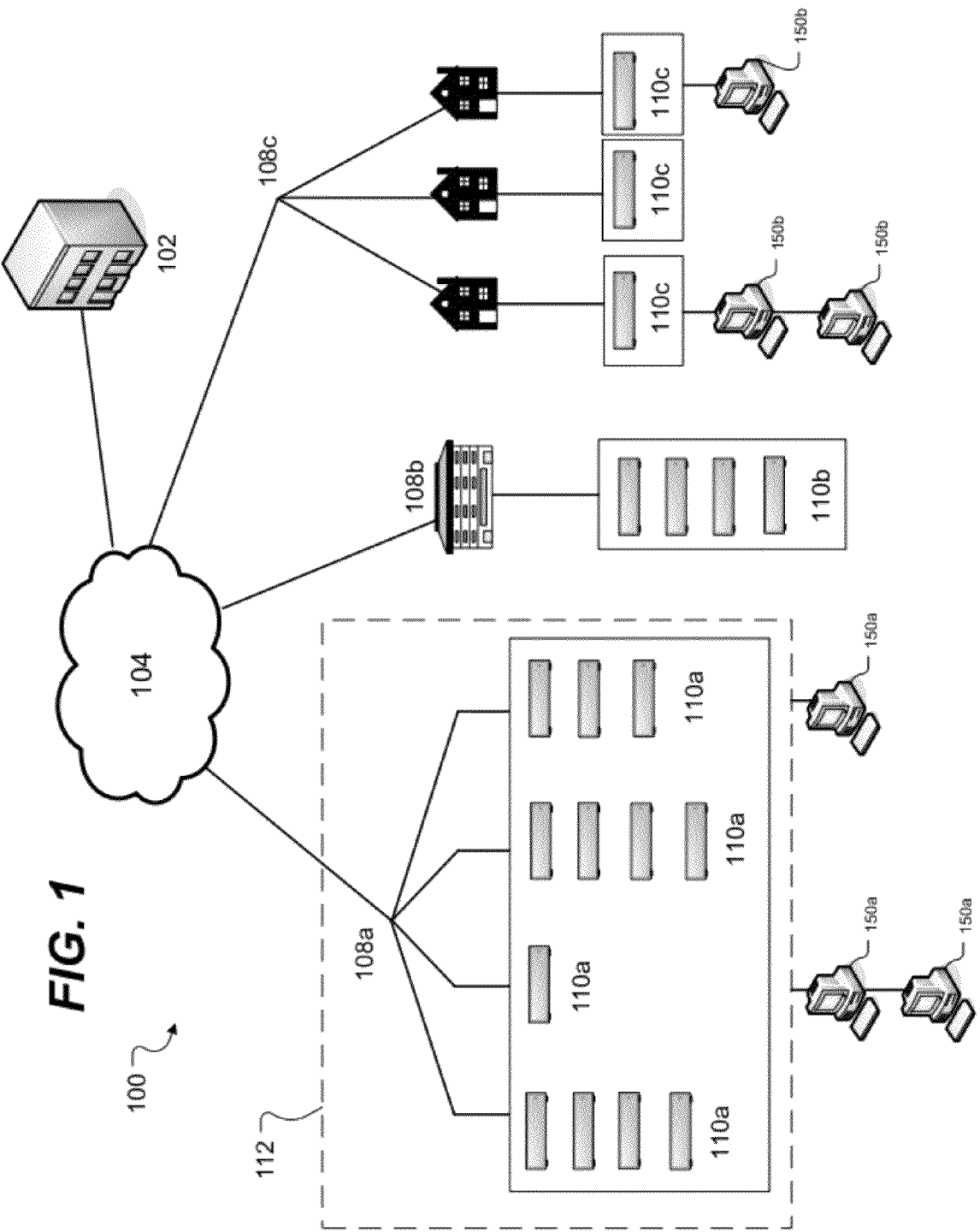
FIG. 1 is a schematic illustration of an exemplary communication network to test communication networks or components thereof, including an exemplary rack structure for a plurality of router cards.

Turning now to FIG. 1, an exemplary communication simulation system 100 is illustrated. The simulated communication system 100 may generally include one or more communication networks 104 (shown in an exemplary manner as one network) configured to support communication between a plurality of communication devices. For example, a plurality of routers 110a, 110b, 110c (collectively, 110) may be in communication with the network 104 and may generally route or otherwise provide for data exchange, e.g., in packets, via network 104.

The routers 110 may generally facilitate communication of devices 150a, 150b (collectively, 150) over network 104. In one exemplary illustration, the routers 110 are broadband routers. Devices 150 may be linked to the routers 110 in any manner that is convenient, e.g., via a wired or wireless connection. The devices 150 may include, but are not limited to, computers, cable boxes, televisions, or the like.

The routers 110 may be organized into groups or nodes 108a, 108b, 108c (collectively, 108) in system 100. The nodes 108 may generally represent network terminals or branches of a communication system, e.g., an optical network terminal. Each node 108 may include hardware and/or software for generally processing signals or data transmitted across network 104. Accordingly, devices 150 connected to the routers 110 may send/receive the desired signal, e.g., optical signals, media content, or the like. Where the system 100 includes fiber optic components or media, the nodes 108 may include any component(s) convenient for generally processing optical signals transmitted through the network 104 to the routers 110.

The communication network 104 may be any type of communication network or system desired to be simulated by the system 100, such as a packet-switched network. Other networks (not shown) may be in communication with the network 104, e.g., a circuit-switched network such as the public switched telephone network (PSTN) or plain old telephone service (POTS) telephone network, packet-switched network such as one supporting Voice over Internet Protocol (VoIP) or the like, or the like. The communication network 104 may include media configured to transmit data, including coaxial cables, copper wire and optical fiber.

In one exemplary illustration, the system 100 includes a test content provider 102 configured to transmit signals, e.g., for testing components of the system 100. For example, the content provider 102 may transmit communication signals and/or media content to devices 150 that are connected to the routers 110. More specifically, each of the routers 110 may generally allow selective connection of communication devices 150 to the routers 110 to allow the devices 150 to communicate via the network 104, e.g., to receive content or other signals from the test content provider 102. In one illustration, a first group of the network devices 150a included on a first node 108a may receive data or other content from a content generator 102 as part of a test of the system 100. Further, the devices 150a may exchange data or other content with other devices 150b that are located on separate nodes 108b, 108c. As will be described further below, the devices 150a and routers 110a included in the first node 108a may be consolidated on a single rack structure 112.

The simulation system 100 may be any size that is convenient. For example, the communication system 100 may extend across cities, states, or even countries, for example where the system includes components or systems of a larger network being tested. Additionally, while a small number of components, e.g., nodes 108, routers 110, and devices 150 are illustrated in system 100, it is to be understood that the number of these components may be fewer than illustrated or may be very large. No numerical or geographical limitation, large or small, should be implied to system 100.

In one exemplary illustration, the system 100 or components thereof may be generally compact to allow use of the system 100 or the components in a laboratory or testing environment, e.g., in a single room or building. In particular, as mentioned above one or more of the routers 110a may be provided in a compact housing or rack structure 112 to facilitate testing of system 100. For example, as shown in FIG. 1, all of the routers 110a on node 108a may be provided in a single compact rack structure 112. In the exemplary illustration shown in FIG. 1, twelve (12) routers 110a are included in a single compact rack structure 112, although the rack structure 112 may accommodate any number of routers 110a that is convenient.

Figure 2A:
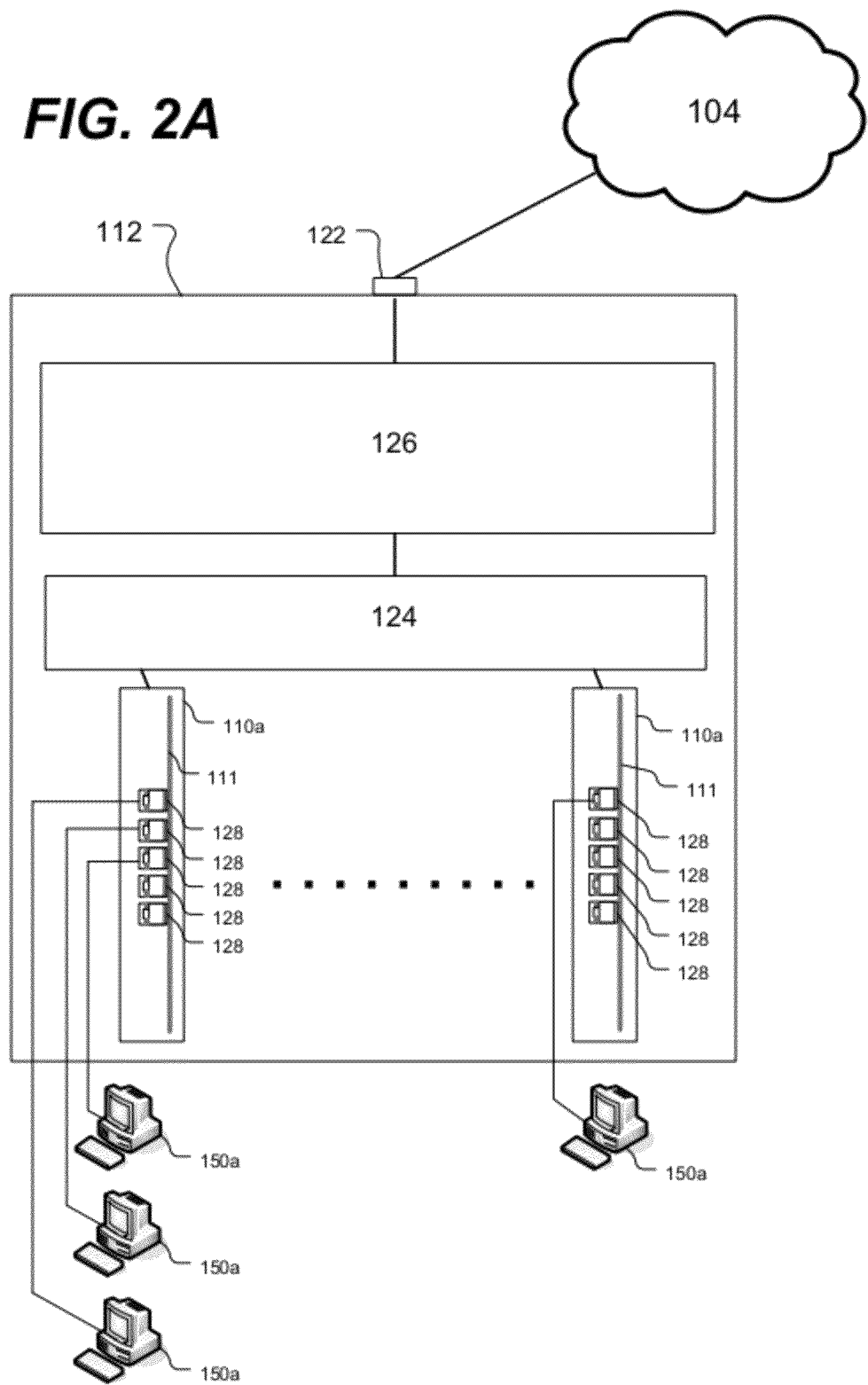
FIG. 2A is a schematic illustration of the exemplary rack structure of FIG. 1.

Turning now to FIG. 2A, which is a schematic illustration, an exemplary rack structure 112 is illustrated in further detail. Two of the twelve routers 110a are illustrated in FIG. 2A for purposes of showing the features thereof in greater detail, although rack structure 112 may include any number of routers 110a that is convenient.

The rack structure 112 may generally include an adjustable cage structure that receives the routers 110a. The routers 110a each may include a respective printed circuit board (PCB) 111. The PCBs 111 may be in communication with a distribution board 124 and a switching circuit 126. More specifically, as best seen in FIG. 2A, each PCB 111 may be in communication with a distribution board 124, which is in turn in communication with switching circuit 126. The PCBs 111 may each include an Ethernet connection for selectively connecting the PCBs 111 to the distribution board 124.

A single external communication port 122 may be provided on the rack structure 112 that is in communication with the switching circuit 126, thereby linking the PCBs 111 to the network 104. In one exemplary illustration, the external communication port 122 is a wide-area network (WAN) port. The switching circuit 126 and distribution board 124 may generally assign unique identifiers to the individual PCBs 111, e.g., to generally simulate performance of the routers 110a as if they were connected individually to the network 104. Further, multiple routers 110a may be in communication with the network 104 via the single communication port 122, thereby simplifying testing of the routers 110a.

The PCB 111 may include a network switch that links devices 150a to the network 104. In one exemplary illustration, the PCBs 111 include a layer-3 switch, e.g., that may generally employ a logical addressing process to route data, e.g., packets, from the devices 150 across network 104.

The devices 150a may connect to the PCBs 111 in any fashion that is convenient. In one exemplary illustration, the PCBs 111 each include a plurality of device ports 128 that allow, for example, selective connection of network devices 150a to the network 104. The device ports 128 may be standardized network connectors, e.g., RJ-45 connectors. As mentioned above, devices 150 may be linked to the PCBs 111 with wireless connections as well.

The PCBs 111 in the rack structure 112 may be configured to establish a virtual local area network (VLAN) with the network 104, thereby allowing the routers 110 to communicate over network 104 via a single external communication port communicating with the routers 110, e.g., the external communication port 122. For example, each router 110 may be individually addressable by a unique identifier, e.g., a VLAN identification on the network 104.

In one exemplary illustration, switching circuit 126 generally serves as an interface between the routers 110 and the external communication port 122. For example, switching circuit 126 may allow for a virtualization of the physically installed PCBs 111 as seen from the perspective of network 104. The switching circuit 126 may assign each PCB 111 a unique identifier via an Ethernet VLAN on the network 104. In some illustrations, these identifiers include virtual local area network addresses determined by the switching circuit 126, e.g. VLAN101, VLAN102, etc. The VLANs may be trunked or multiplexed together in the switching circuit and handed off via the external communication port 122 by the switching circuit 126. This allows for each of the plurality of installed routers 110 and/or PCBs 111 to be addressed separately and accessed with a single connection to the network 104, i.e., via external communication port 122.

Accordingly, the rack structure 112 may support multiple router cards, e.g., in the form of PCBs 111, that in turn allow communication over network 104 by a relatively large number of devices 150 connected to device communication ports 128 of the routers 110. Further, the rack structure 112 provides a relatively compact size in comparison with the number of routers 110 included in the rack structure 112, as a result of the direct incorporation of router components, e.g., PCBs 111 and device ports 128, into the rack structure 112. Additionally, the switching circuit 126 may be in physical communication with the routers 110a or may be otherwise compacted with the routers 110a, decreasing an overall size or footprint of the rack structure 112 and/or routers 110a. Additionally, the rack structure 112 simplifies connections of a plurality of routers 110a to network 104, e.g., for testing of routers 110a or devices 150a, as a result of allowing a plurality of routers 110a in the single rack structure 112 to be connected to the network 104 via a single connection, e.g., external communication port 122. The rack structure 112 may also be generally flexible in size and configuration to accept any number of routers 110 that is convenient.

Computing devices in various embodiments such as routers 110, PCBs 111, switching circuit 126, distribution board 124, or other components of system 100 may each include instructions executable by one or more computing devices such as those listed above. Such instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any tangible medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of tangible computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, as described hereinafter, or any other medium from which a computer can read.

Figure 2C:
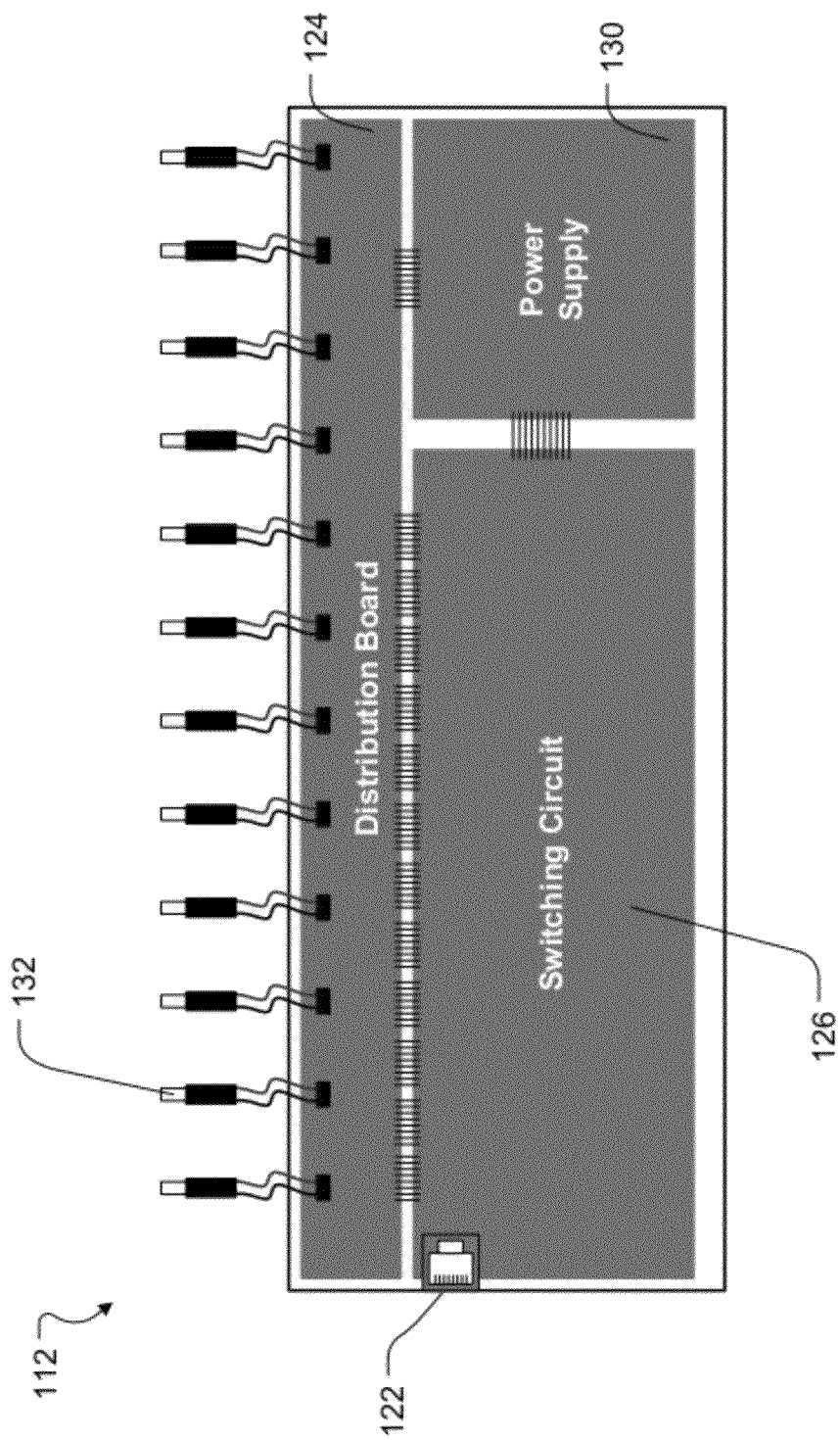
FIG. 2C is a top view of the exemplary rack structure of FIG. 2B.
Figure 2D:
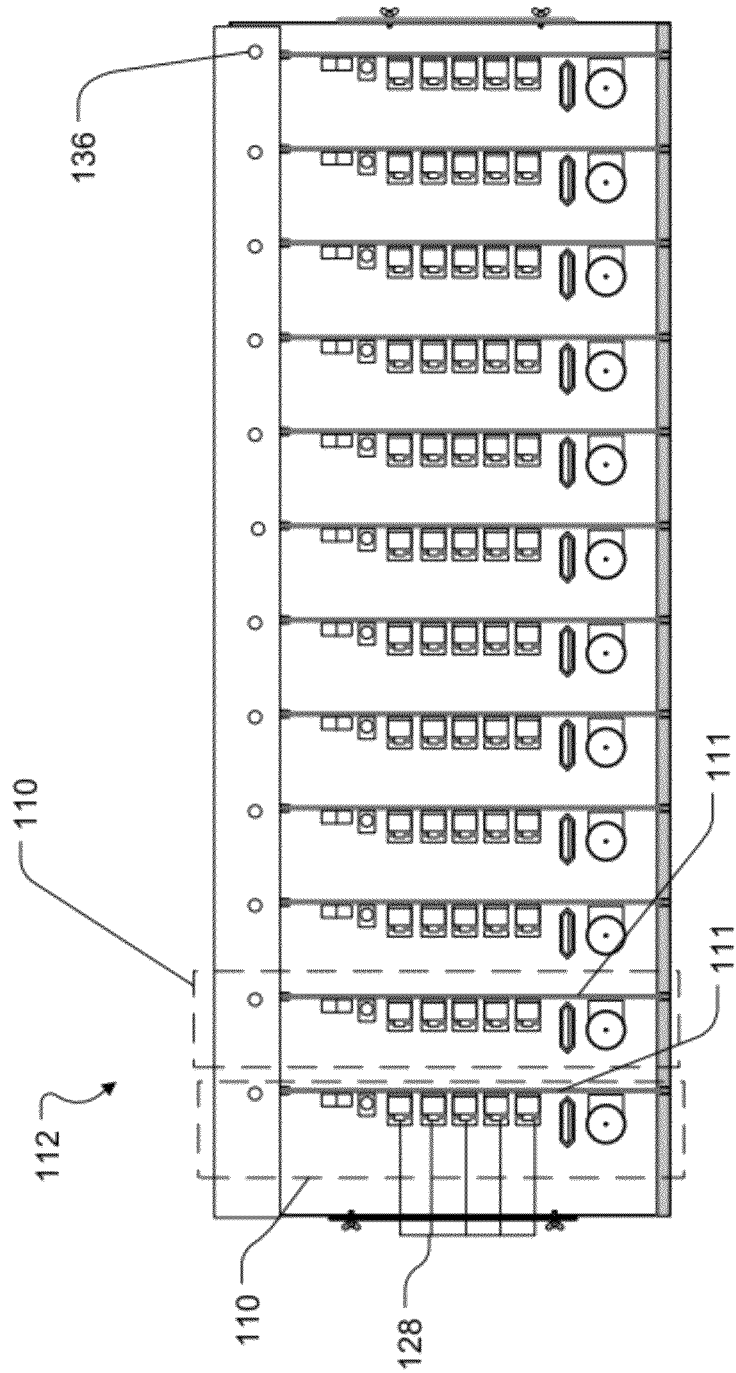
FIG. 2D is a rear view of the exemplary rack structure of FIGS. 2B and 2C.
Figure 2E:
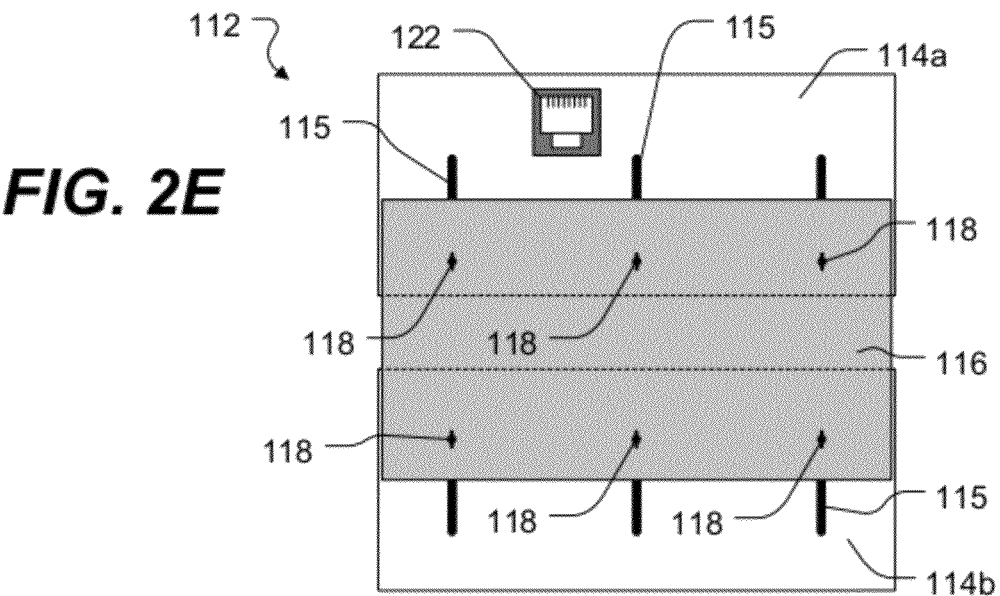
FIG. 2E is a side view of the exemplary rack structure of FIGS. 2B, 2C, and 2D.

Turning now to FIGS. 2B-2D, the rack structure 112 is illustrated in further detail. Rack structure 112 may be a standardized rack having a predetermined width, or may be adjustable. In one illustration, the rack structure 112 defines a width to fit a 19-inch vertical stacking structure or rack that receives a plurality of rack structures 112. While rack structure 112 is shown having twelve (12) bays or slots for receiving the routers 110, any number of bays may be provided that is convenient to accommodate a desired number of routers 110a. Accordingly, any size or configuration may be employed for the rack structure 112 that is convenient.

The rack structure 112 may also be adjustable vertically in size to accommodate different size PCBs 111. For example, as best seen in FIG. 2D the rack structure 112 may include an upper shell 114a and a lower shell 114b that each defines a plurality of slots 115 receiving adjustable fasteners 118. The fasteners 118 generally maintain the shells 114 in a fixed spaced arrangement with a plate 116. In one example, the fasteners 118 include a bolt and nut that selectively secure the upper and lower shells 114a, 114b to respective upper and lower portions of the plate 116. Accordingly, the fasteners 118 may be loosened to allow the shells 114a, 114b to slide along the plate 116. The slots 115 may thus generally define in part a maximum height for the rack structure 112, as the slots 115 generally limit the movement of the fasteners 118 along the shells 114.

As described above, the routers 110 may each be connected to the network 104 through a distribution board 124 that provides an interface between the routers 110 and the external communication port 122. The distribution board 124 may be in communication with the PCBs 111 via a standardized connection. In one exemplary illustration, the distribution board 124 may be connected to each of the PCBs 111 with a CAT5 patch cable (not shown) received in mating connectors, e.g., RJ-45 connectors, of the PCBs 111 and the distribution board 124.

As best seen in FIG. 2C, a power supply 130 may be provided to supply electrical power to components of the compact rack structure 112, e.g., the distribution board 124, switching circuit 126, and PCBs 111. Power supply 130 may generally supply power from a single standardized connector to the PCBs 111 via the distribution board 124. For example, as best seen in FIG. 2D, a female power socket 136 may be provided on rack structure 112 that is configured to receive power from a wall socket to supply power to the power supply 130. In one exemplary illustration, the power supply 130 may include a circuit board that supplies power with selectable voltage and amperage appropriate for each of the PCBs 111 via the distribution board 124. The supplied voltage and current may thereby be adjusted to suit a wide variety of PCBs 111 that are incorporated into the routers 110. In one exemplary illustration, the power supply circuit board includes a line voltage (e.g., 110/220 volt) switching power supply that supplies power to both the switching circuit 126 and to each of the installed PCBs 111 via the distribution board 124. The PCBs 111 may each include power indicators 134 that provide a visual confirmation that any given PCB 111 is receiving power, as best seen in FIG. 2B.

Figure 3:
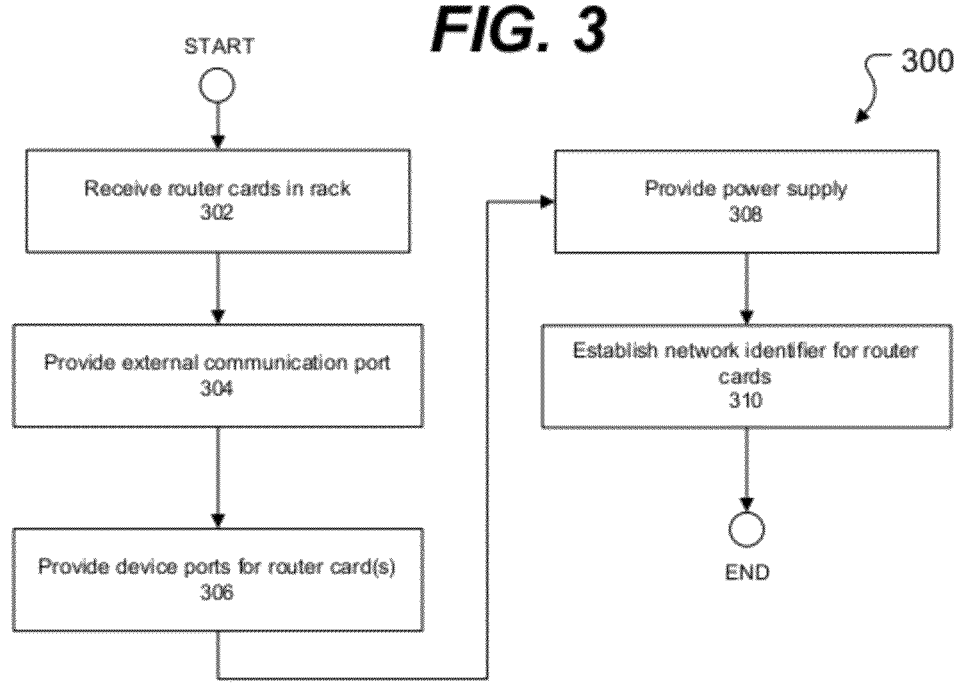
FIG. 3 illustrates an exemplary process for providing a plurality of routers, e.g., to a communication simulation system to test the system or components thereof.

Turning now to FIG. 3, an exemplary process 300 for providing a plurality of routers 110 is illustrated. Process 300 may begin at block 302, where a plurality of router cards is received in a rack structure. For example, as described above a plurality of PCBs 111 may be installed in the rack structure 112. In one exemplary illustration, the PCBs 111 provide a minimal physical size that can be incorporated into the rack structure 112 to provide a relatively large density of routers 110 within the rack structure 112. Further, the PCBs 111 may generally provide routing and addressing for devices connected to communication ports of the PCBs 111, e.g., ports 128. Accordingly, a relatively large number of devices may be connected to the network 104 via the rack structure defined by the rack structure 112. Process 300 may then proceed to block 304.

In block 304, a single external communication port, e.g., port 122, may be provided to allow communication between the routers 110 and/or PCBs 111. As described above, the port 122 may be configured to be selectively connected to the external network 104 to allow communication between the plurality of PCBs 111 and the external network 104. Further, the port 122 may provide a single connection for the rack structure 112 a plurality of the PCBs 111 with the network 104. In one exemplary illustration, all of the PCBs 111 within the rack structure 112 connect to the network 104 via the single external port 122. Process 300 may then proceed to block 306.

At block 306, a plurality of standardized communication ports may be provided for each router card, e.g., PCB 111. For example, communication ports 128 may be provided that are configured to receive a mating RJ-45 plug of from one or more communication or network devices, thereby allowing selective connection of the devices to PCBs 111. Accordingly, the devices may communicate with the network 104 via the PCBs 111. Process 300 may then proceed to block 308.

At block 308, a power source may be provided for the rack structure 112. For example, as described above a power supply 130 may include a circuit board in communication with the distribution board 124. The power supply 130 may thus supply power to each of the plurality of network router cards, i.e., PCBs 111. Additionally, the power supply 130 may be configured to supply a plurality of selectable power potentials, e.g., different voltages and/or currents, to the PCBs 111.

Proceeding to block 310, a unique identifier for each of the plurality of network router cards, e.g., PCBs 111, may be established. In one exemplary illustration, a distribution board 124 for PCBs 111 may be provided. For example, as described above distribution board 124 may be in communication with a switching circuit 126 of the rack structure 112. The distribution board 124 and switching circuit 126 may generally be configured to consolidate the plurality of PCBs 111 to the external communication port 122 for purposes of communicating over the network 104, e.g., by establishing unique addresses for each of the PCBs 111 on the network 104. In one exemplary illustration, the switching circuit 126 may provide a distinct VLAN address for each of the plurality of PCBs 111. Process 300 may then terminate.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

What is claimed is:

1. A communication router rack, comprising:
    a plurality of network router cards, each of the network router cards having a plurality of communication ports, and each of the network router cards being configured to:
        establish a virtual local area network, and
        facilitate selective communication between a communication device connected to one of the communication ports respective to that network router card and the virtual local area network to simulate router performance by that network card for the virtual local area network,
    wherein the communication router rack defines a plurality of bays in a housing, each bay enclosing a respective one of the plurality of network router cards;
    a switching circuit enclosed by the housing, the switching circuit in physical communication with the plurality of network router cards, the switching circuit configured to establish a unique network identifier for each of the plurality of network router cards; and
    an external communication port configured to
        connect the communication router rack and an external network and
        facilitate communication between at least two of the plurality of network router cards and the external network via respective external virtual connections of the virtual local area networks of the least two of the plurality of network router cards through the external communication port.

2. The communication router rack of claim 1, wherein each of the network router cards are configured to be individually addressable based on a respective unique identifier in support of each of the network router cards being configured to establish and manage the virtual local area networks.

3. The communication router rack of claim 1, wherein each of the plurality of network router cards includes a switch allowing selective communication with the external network via the switching circuit.

4. The communication router rack of claim 3, wherein the switches are layer-3 network switches.

5. The communication router rack of claim 1, further comprising a distribution board in physical communication with the switching circuit and the plurality of network router card cards, the distribution board configured to allow selective communication between the plurality of network router cards and the switching circuit.

6. The communication router rack of claim 5, wherein the distribution board and switching circuit are configured to consolidate communications from the plurality of network router cards onto the external communication port.

7. The communication router rack of claim 1, wherein the network router cards are broadband router cards.

8. The communication router rack of claim 1, wherein the network router cards each include a plurality of standardized communication ports for allowing selective connection of a communication device, thereby allowing communication between the communication device and the external network via the router card.

9. The communication router rack of claim 1, further comprising a power connection card configured to supply power to each of the plurality of network router cards and the switching circuit, the power connection card including a power connector configured to receive power for supplying to the network router cards.

10. The communication router rack of claim 9, wherein the power connection card is configured to supply a plurality of selectable power potentials to the network router cards.

11. The communication router rack of claim 1, wherein the external communication port is configured to allow communication between all of the network router cards included in the communication router rack.

12. The communication router rack of claim 1, wherein the housing is adjustable in at least one dimension, and wherein the housing includes a plurality of shells having at least one slot defining in part a maximum extension of the plurality of shells along the at least one dimension.

13. The communication router rack of claim 1, wherein the external communication port is configured to facilitate communication by further being configured to:
consolidate connections of the at least two network router cards to the external network into a single connection thereby allowing the plurality of network router cards to be present within the housing.

14. The communication router rack of claim 1, wherein the external virtual connections include:
a first virtual connection that connects one of the two of the plurality of network router cards through the external communication port to the external network and
a second virtual connection that connects another of the two of the plurality of network router cards through the external communication port to the external network.

15. A communication network simulation system, comprising:
a test communication network configured to transmit data to a plurality of communication devices; and
a communication router rack in communication with the network, including:
a plurality of network router cards, each of the network router cards including a plurality of communication ports, and each of the network router cards being configured to:
establish a virtual local area network, and
facilitate selective communication between a communication device connected to one of the communication ports respective to that network router card and the virtual local area network to simulate router performance by that network card for the virtual local area network,
wherein the communication router rack defines a plurality of bays in a housing, each bay enclosing a respective one of the plurality of network router cards;
a switching circuit enclosed by the housing, the switching circuit in physical communication with the plurality of network router cards, the switching circuit configured to establish a unique network identifier for each of the plurality of network router cards; and
an external communication port configured to connect the communication router rack and an external network and to facilitate communication between at least two of the plurality of network router cards and the test communication network via respective external virtual connections through the virtual local area networks of the least two of the plurality of network router cards of the external communication port.

16. The communication network simulation system of claim 15, wherein each of the network router cards are configured to be individually addressable based on a respective unique identifier in support of each of the network router cards being configured to establish and manage the virtual local area networks.

17. The communication network simulation system of claim 15, further comprising a distribution board in physical communication with the switching circuit and the plurality of network router card cards, the distribution board configured to allow selective communication between the plurality of network router cards and the switching circuit;
wherein the distribution board and switching circuit are configured to consolidate communications from the plurality of network router cards onto the external communication port.

18. The communication network simulation system of claim 15, wherein the network router cards each include a single printed circuit board.

19. The communication network simulation system of claim 15, wherein the network router cards each include a plurality of standardized communication ports for allowing selective connection of a communication device, thereby allowing communication between the communication device and the external network via the router card.

20. The communication network simulation system of claim 15, wherein the external communication port is configured to facilitate communication by further being configured to:
consolidate connections of the at least two network router cards to the test communication network into a single connection thereby allowing the plurality of network router cards to be present within the housing.

21. A method, comprising:
receiving a plurality of network router cards in a rack structure, each of the network router cards including a plurality of communication ports;
establishing a virtual local area network for each received router card;
simulating router performance for each virtual local area network;
configuring each of the plurality of communication ports for allowing selective communication between a communication device and the virtual local area network, the rack structure defining a plurality of bays in a housing, each bay enclosing a respective one of the plurality of network router cards;
selectively connecting a single external communication port of the rack structure to an external network;
facilitating communication between at least two of the plurality of network router cards and the external network via respective external virtual connections of the virtual local area networks of the least two of the plurality of network router cards through the single external communication port; and
establishing a unique network identifier for each of the plurality of network router cards with a switching circuit in communication with the plurality of network router cards.

22. The method of claim 21, further comprising providing a plurality of standardized communication ports for each router card, the standardized communication ports configured to allow selective connection of a communication device, thereby allowing communication between the communication device and the external network via the router card.

23. The method of claim 21, further comprising providing a power connection card configured to supply power to each of the plurality of network router, and supplying a plurality of selectable power potentials to the network router cards via the power connection card.

24. The method of claim 21, further comprising enabling each virtual local area network to be individually addressable based on the respective unique network identifier.

25. The method of claim 21, wherein facilitating communication further comprises:
consolidating the external virtual connections of the at least two network router cards into single connection thereby allowing the plurality of network router cards to be present within the housing.

* * * * *